(12) United States Patent
Nook et al.

(10) Patent No.: US 11,114,777 B2
(45) Date of Patent: Sep. 7, 2021

(54) BATTERY CLAMP DEVICE

(71) Applicant: THE NOCO COMPANY, Glenwillow, OH (US)

(72) Inventors: Jonathan Lewis Nook, Gates Mills, OH (US); William Knight Nook, Sr., Shaker Heights, OH (US); James Richard Stanfield, Glendale, AZ (US); Derek Michael Underhill, Tempe, AZ (US)

(73) Assignee: THE NOCO COMPANY, Glenwillow, OH (US)

( * ) Notice: Subject to any disclaimer, the term of this patent is extended or adjusted under 35 U.S.C. 154(b) by 0 days.

(21) Appl. No.: 16/846,606

(22) Filed: Apr. 13, 2020

(65) Prior Publication Data

US 2020/0335885 A1 Oct. 22, 2020

Related U.S. Application Data

(60) Provisional application No. 62/835,924, filed on Apr. 18, 2019, provisional application No. 62/834,699, filed on Apr. 16, 2019.

(51) Int. Cl.
*H01R 11/24* (2006.01)
*H01R 11/28* (2006.01)

(52) U.S. Cl.
CPC .......... *H01R 11/24* (2013.01); *H01R 11/282* (2013.01)

(58) Field of Classification Search
CPC ...... H01R 11/281; H01R 11/287; H01R 4/30; H01R 11/24
See application file for complete search history.

(56) References Cited

U.S. PATENT DOCUMENTS

| | | | |
|---|---|---|---|
| 7,104,815 B2* | 9/2006 | Ng | H01R 11/24 439/135 |
| 9,692,155 B2* | 6/2017 | Toscani | H01R 11/24 |

* cited by examiner

*Primary Examiner* — Briggitte R. Hammond
(74) *Attorney, Agent, or Firm* — Vorys, Safer, Seymour and Pease LLP; William L. Klima

(57) ABSTRACT

A battery clamp having a first inner metal battery clamp member having a handle portion and a clamp portion, a second inner metal battery clamp member having a handle portion and a clamp portion, a first outer insulating battery clamp member having a handle portion and a clamp portion connected to the first inner metal battery clamp, and a second outer insulating battery clamp member having a handle portion and a clamp portion connected to the second inner metal battery clamp. The first inner metal battery clamp member and/or the second inner metal battery clamp member having an inclined connection plate for connection with a battery cable, the inclined connect plate configured to allow a user to access the inclined access plate with a tool while avoiding interference with the handle portions of the battery clamp.

17 Claims, 17 Drawing Sheets

BATTERY CLAMP DEVICE

FIELD

The present invention is directed to a battery clamp device for use, for example, with battery jump starting cables or battery jump starters.

BACKGROUND

Currently, there exist a number of battery clamps used on jump starting cables or battery jump starters.

There exists a need for an improved battery clamp.

SUMMARY

The present invention is direct to an improved battery clamp device. The battery clamp device comprises or consists of an outer battery clamp connected to an inner battery clamp. The outer battery clamp, for example, can be made of an electrically insulating material and the inner battery clamp can be made of an electrically conductive material (e.g. metal). The inner battery clamp nests within the outer battery clamp, and are connected together (e.g. by snap fit connector and/or mechanical connection).

The battery clamp device is configured to facilitate connection with a battery cable. Specifically, the battery clamp device is configured to prevent mechanical interference with a user's fingers or a tool for connecting or disconnecting fastener connecting the battery cable to the battery clamp device. For example, the inner battery clamp is provided with an inclined plate configured to prevent mechanical interference with handle portions of the battery clamp device by placing the axis of a threaded fastener for connecting the battery cable at an angle to at least one of the handle portions.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device.

The presently described subject matter is directed to a battery clamp device, comprising or consisting of: a first inner metal battery clamp member having a handle portion and a clamp portion; a second inner metal battery clamp member having a handle portion and a clamp portion; a first outer plastic battery clamp member connected to the first inner metal battery clamp; a second outer plastic battery clamp member connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being an inclined metal plate, wherein the inclined metal plate is oriented to allow a tool to align with a threaded fastener for tightening or loosening the threaded fastener without mechanical interference from handle portions of the battery clamp device.

The presently described subject matter is directed to a battery clamp device, comprising or consisting of: a first inner metal battery clamp member having a handle portion and a clamp portion; a second inner metal battery clamp member having a handle portion and a clamp portion; a first outer plastic battery clamp member connected to the first inner metal battery clamp; a second outer plastic battery clamp member connected to the second inner metal battery clamp; a pivot pin pivotally connecting the first inner metal battery clamp member to the second inner metal battery clamp member; and a battery cable connector connected between a pair of inner edges of the at least one of the first inner metal battery clamp member and the second inner metal battery clamp member, the battery cable connector being an inclined metal plate having a threaded hole, wherein the inclined metal plate is oriented transverse relative to the at least one of the first inner metal battery clamp member and the second inner metal battery clamp member to allow a tool to align with a threaded fastener for tightening or loosening the threaded fastener without mechanical interference from handle portions of the battery clamp device.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the metal plate is an inclined metal plate.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the metal plate is an inclined metal plate, and wherein the inclined metal plate is oriented transversely relative to the at least one of the first inner metal battery clamp member and the second inner metal battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the metal plate is an inclined metal plate, wherein the inclined metal plate is oriented transversely relative to the at least one of the first inner metal battery clamp member and the second inner metal battery clamp member, and wherein at least one of the first inner metal battery clamp member and the second inner metal battery clamp member have a U-shaped transverse cross section along a length of at least one of the first inner metal battery clamp member and the second inner metal battery clamp member providing a pair of spaced apart inner edges, the inclined metal plate extending between the pair of spaced apart inner edges.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the metal plate is an inclined metal plate, wherein the inclined metal plate is oriented transversely relative to the at least one of the first inner metal battery clamp member and the second inner metal battery clamp member, wherein at least one of the first inner metal battery clamp member and the second inner metal battery clamp member have a U-shaped transverse cross section along a length of at least one of the first inner metal battery clamp member and the second inner metal battery clamp member providing a pair of spaced apart inner edges, the inclined metal plate extending between the pair of spaced apart inner edges, and wherein a low end of the inclined metal plate abuts one edge of the pair of spaced apart inner edges and a high end of the inclined metal plate bends towards an opposite edge of the pair of spaced apart inner edges and connects to the opposite edge of the pair of spaced apart inner edges.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the metal plate is an inclined metal plate, wherein the inclined metal plate is oriented transversely relative to the at least one of the first inner metal battery clamp member and the second inner metal battery clamp member, wherein at least one of the first inner metal battery clamp member and the second inner metal battery clamp member have a U-shaped transverse cross section along a length of at least one of the first inner metal battery clamp member and the second inner metal battery clamp member providing a pair of spaced apart inner edges, the inclined metal plate extending between the pair of spaced apart inner edges, wherein a low end of the inclined metal plate abuts one edge of the pair of spaced apart inner edges and a high end of the inclined metal plate bends towards an opposite edge of the pair of spaced apart inner edges and connects to the opposite edge of the pair of spaced apart inner edges, and wherein a portion of the inclined metal plate that bends towards the opposite edge of the pair of spaced apart inner edges is bent to provide a step that abuts a top of the opposite edge of the pair of spaced apart inner edges.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the metal plate is an inclined metal plate, wherein the inclined metal plate is oriented transversely relative to the at least one of the first inner metal battery clamp member and the second inner metal battery clamp member, wherein at least one of the first inner metal battery clamp member and the second inner metal battery clamp member have a U-shaped transverse cross section along a length of at least one of the first inner metal battery clamp member and the second inner metal battery clamp member providing a pair of spaced apart inner edges, the inclined metal plate extending between the pair of spaced apart inner edges, wherein a low end of the inclined metal plate abuts one edge of the pair of spaced apart inner edges and a high end of the inclined metal plate bends towards an opposite edge of the pair of spaced apart inner edges and connects to the opposite edge of the pair of spaced apart inner edges, and wherein a portion of the inclined metal plate that bends towards the opposite edge of the pair of spaced apart inner edges is bent to provide a step that abuts a top of the opposite edge of the pair of spaced apart inner edges, and wherein an end portion of the inclined metal plate that bends towards the opposite edge of the pair of inner edges and located below the step abuts an inner side of the opposite edge.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the metal plate is an inclined metal plate, wherein the inclined metal plate is oriented transversely relative to the at least one of the first inner metal battery clamp member and the second inner metal battery clamp member, wherein at least one of the first inner metal battery clamp member and the second inner metal battery clamp member have a U-shaped transverse cross section along a length of at least one of the first inner metal battery clamp member and the second inner metal battery clamp member providing a pair of spaced apart inner edges, the inclined metal plate extending between the pair of spaced apart inner edges, wherein a low end of the inclined metal plate abuts one edge of the pair of spaced apart inner edges and a high end of the inclined metal plate bends towards an opposite edge of the pair of spaced apart inner edges and connects to the opposite edge of the pair of spaced apart inner edges, and wherein a portion of the inclined metal plate that bends towards the opposite edge of the pair of spaced apart inner edges is bent to provide a step that abuts a top of the opposite edge of the pair of spaced apart inner edges, wherein an end portion of the inclined metal plate that bends towards the opposite edge of the pair of inner edges and located below the step abuts an inner side of the opposite edge, and wherein the low end and the high end of the inclined metal plate are welded to a respective edge of the pair of spaced apart inner edges.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the first inner metal battery clamp member is provided with a pair of pivot plate portions and the second inner metal battery clamp member is provided with a pair of pivot plate portions, wherein the pair of pivot plate portions of the first inner metal battery clamp member overlap with the pair of pivot plate portions of the second inner metal battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the first inner metal battery clamp member is provided with a pair of pivot plate portions and the second inner metal battery clamp member is provided with a pair of pivot plate portions, wherein the pair of pivot plate portions of the first inner metal battery clamp member overlap with the pair of pivot plate portions of the second inner metal battery clamp member, and wherein the pair of pivot plate portions of the first inner metal battery clamp member are provided with arc-shaped flanges protruding outwardly from the sides of the first inner metal battery clamp member to accommodate the pivot plate portions of the second inner metal battery clamp, wherein the pivot plate portions of the second inner metal battery clamp are arc-shaped and nest within the arc-shaped flanges protruding outwardly from the sides of the first inner metal battery clamp.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the first inner metal battery clamp member having the handle portion and the clamp portion nests within at least a portion of the first outer insulating battery clamp member having the handle portion and the clamp portion connected to the first inner metal battery clamp, and wherein a second inner metal battery clamp member having a handle portion and a clamp portion nests within at least a portion of the second outer insulating battery clamp member having the handle portion and the clamp portion connected to the second inner metal battery clamp.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the first inner metal battery clamp member having the handle portion and the clamp portion nests within at least a portion of the first outer insulating battery clamp member having the handle portion and the clamp portion connected to the first inner metal battery clamp, and wherein a second inner metal battery clamp member having a handle portion and a clamp portion nests within at least a portion of the second outer insulating battery clamp member having the handle portion and the clamp portion connected to the second inner metal battery clamp, wherein the first outer insulating battery clamp member snap fits onto the first inner metal battery clamp member, and wherein the second outer insulating battery clamp member snap fits onto the second inner metal battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the first inner metal battery clamp member having the handle portion and the clamp portion nests within at least a portion of the first outer insulating battery clamp member having the handle portion and the clamp portion connected to the first inner metal battery clamp, wherein a second inner metal battery clamp member having a handle portion and a clamp portion nests within at least a portion of the second outer insulating battery clamp member having the handle portion and the clamp portion connected to the second inner metal battery clamp, wherein the first outer insulating battery clamp member snap fits onto the first inner metal battery clamp member, and wherein the second outer insulating battery clamp member snap fits onto the second inner metal battery clamp member, wherein the first outer insulation battery clamp member comprises a snap fit protrusion snap fitting into a slot provided in the first inner metal battery clamp member, and wherein the second outer insulation battery clamp member comprises a snap fit protrusion snap fitting into a slot provided in the second inner metal battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the first inner metal battery clamp member having the handle portion and the clamp portion nests within at least a portion of the first outer insulating battery clamp member having the handle portion and the clamp portion connected to the first inner metal battery clamp, wherein a second inner metal battery clamp member having a handle portion and a clamp portion nests within at least a portion of the second outer insulating battery clamp member having the handle portion and the clamp portion connected to the second inner metal battery clamp, wherein the first outer insulating battery clamp member snap fits onto the first inner metal battery clamp member, and wherein the second outer insulating battery clamp member snap fits onto the second inner metal battery clamp member, wherein the first outer insulation battery clamp member comprises a snap fit protrusion snap fitting into a slot provided in the first inner metal battery clamp member, wherein the second outer insulation battery clamp member comprises a snap fit protrusion snap fitting into a slot provided in the second inner metal battery clamp member, wherein the first outer insulation battery clamp member comprises a plurality of spaced apart snap fit protrusions snap fitting into a plurality of spaced apart slot, respectively, in the first inner metal battery clamp member, and wherein the second outer insulation battery clamp member comprises a plurality of spaced apart snap fit protrusions snap fitting into a plurality of spaced apart slots provided in the second inner metal battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the first inner metal battery clamp member having the handle portion and the clamp portion nests within at least a portion of the first outer insulating battery clamp member having the handle portion and the clamp portion connected to the first inner metal battery clamp, wherein a second inner metal battery clamp member having a handle portion and a clamp portion nests within at least a portion of the second outer insulating battery clamp member having the handle portion and the clamp portion connected to the second inner metal battery clamp, wherein the first outer insulating battery clamp member snap fits onto the first inner metal battery clamp member, and wherein the second outer insulating battery clamp member snap fits onto the second inner metal battery clamp member, wherein the first outer insulation battery clamp member comprises a snap fit protrusion snap fitting into a slot provided in the first inner metal battery clamp member, wherein the second outer insulation battery clamp member comprises a snap fit protrusion snap fitting into a slot provided in the second inner metal battery clamp member, and wherein each snap fit protrusion is split into two protrusion portions each having an edge barb portion to grip inner edges of respective slots after being snap fitted to prevent disconnection of each snap fit protrusion from each respective slot.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the first inner metal battery clamp member is provided with a pair of pivot plate portions and the second inner metal battery clamp member is provided with a pair of pivot plate portions, wherein the pair of pivot plate portions of the first inner metal battery clamp member overlap with the pair of pivot plate portions of the second inner metal battery clamp member, wherein the pair of pivot plate portions of the first inner metal battery clamp member are provided with arc-shaped flanges protruding outwardly from the sides of the first inner metal battery clamp member to accommodate the pivot plate portions of the second inner metal battery clamp, wherein the pivot plate portions of the second inner metal battery clamp are arc-shaped and nest within the arc-shaped flanges protruding outwardly from the sides of the first inner metal battery clamp, wherein the arc-shaped flanges protruding outwardly from the sides of the first inner metal battery clamp member nest within arc-shaped inner edge portions of the first outer insulating battery clamp member, and wherein the arc-shaped pivot plate portions of the first inner metal battery clamp nest with arc-shaped inner edge portions of the second outer insulating battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the handle portion of the first outer insulating battery clamp member is provided with a protrusion, and wherein the handle portion of the second outer insulating battery clamp member is provided with a protrusion.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an inner side at least one of the first inner metal battery clamp member and the second inner metal battery clamp member, the battery cable connector being a metal plate having a threaded hole, wherein the metal plate is oriented to allow a tool to align with a threaded fastener for tightening or loosening the threaded fastener without mechanical interference from handle portions of the battery clamp device, wherein the protrusions form an X-shaped protrusion when the handle portions are squeezed together.

DETAILED DESCRIPTION

A battery clamp device 10 according to the present invention is shown in FIGS. 1-17. The battery clamp device 10 comprises an outer battery clamp 10A connected to an inner battery clamp 10B, as shown in FIG. 1.

The outer battery clamp portion 10A can be made, for example, of an electrically insulating material (e.g. resin, synthetic resin, plastic, rubber, fiberglass, composite, or other suitable electrical insulating material). The inner battery clamp portion 10B can be made, for example, of an electrically conductive material (e.g. metal, steel, metal alloy, steel alloy, plated steel, chrome plated steel, nickel plated steel, aluminum, anodized aluminum copper, or other suitable electrically conductive material).

Figure 1:
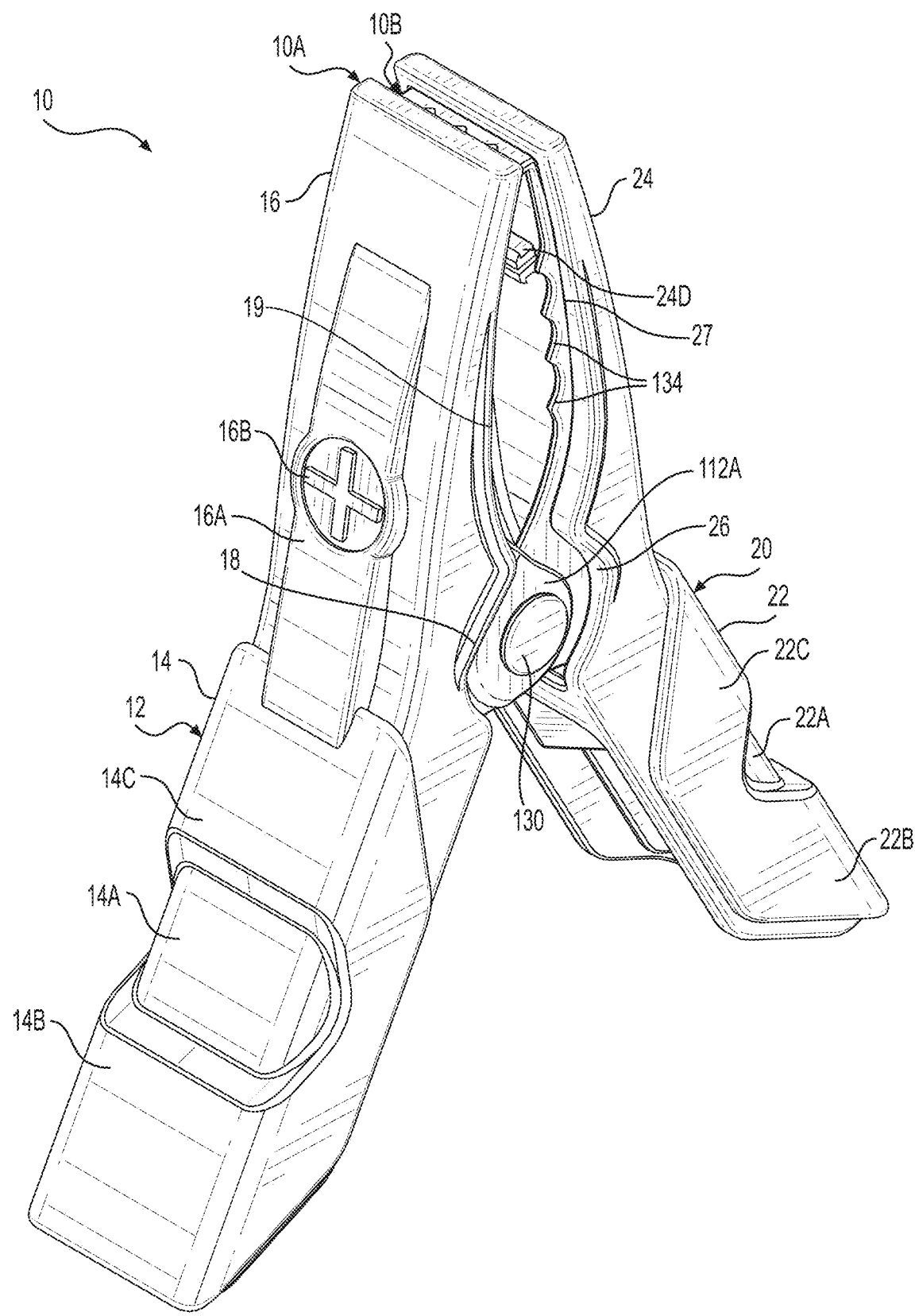
FIG. 1 is a perspective view of a positive polarity battery clamp according to the present invention.
Figure 2:
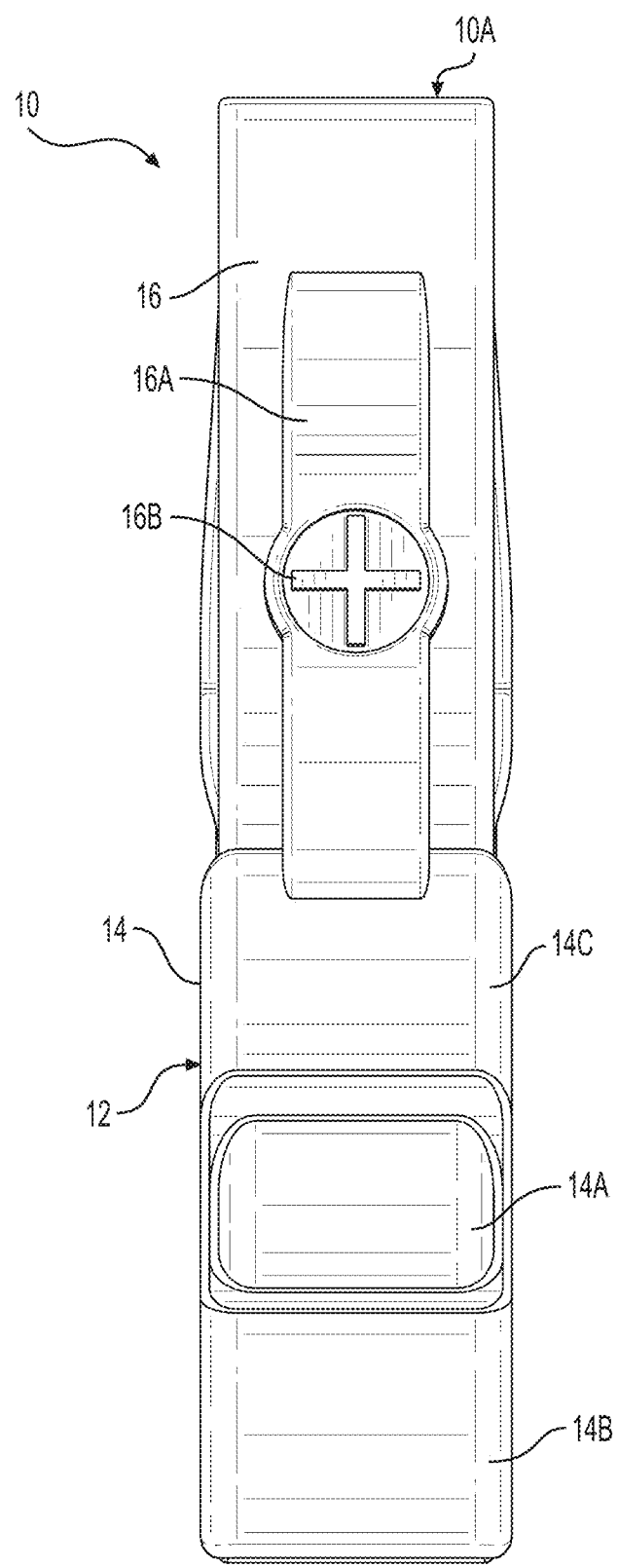
FIG. 2 is a left side view of the battery clamp shown in FIG. 1.
Figure 3:
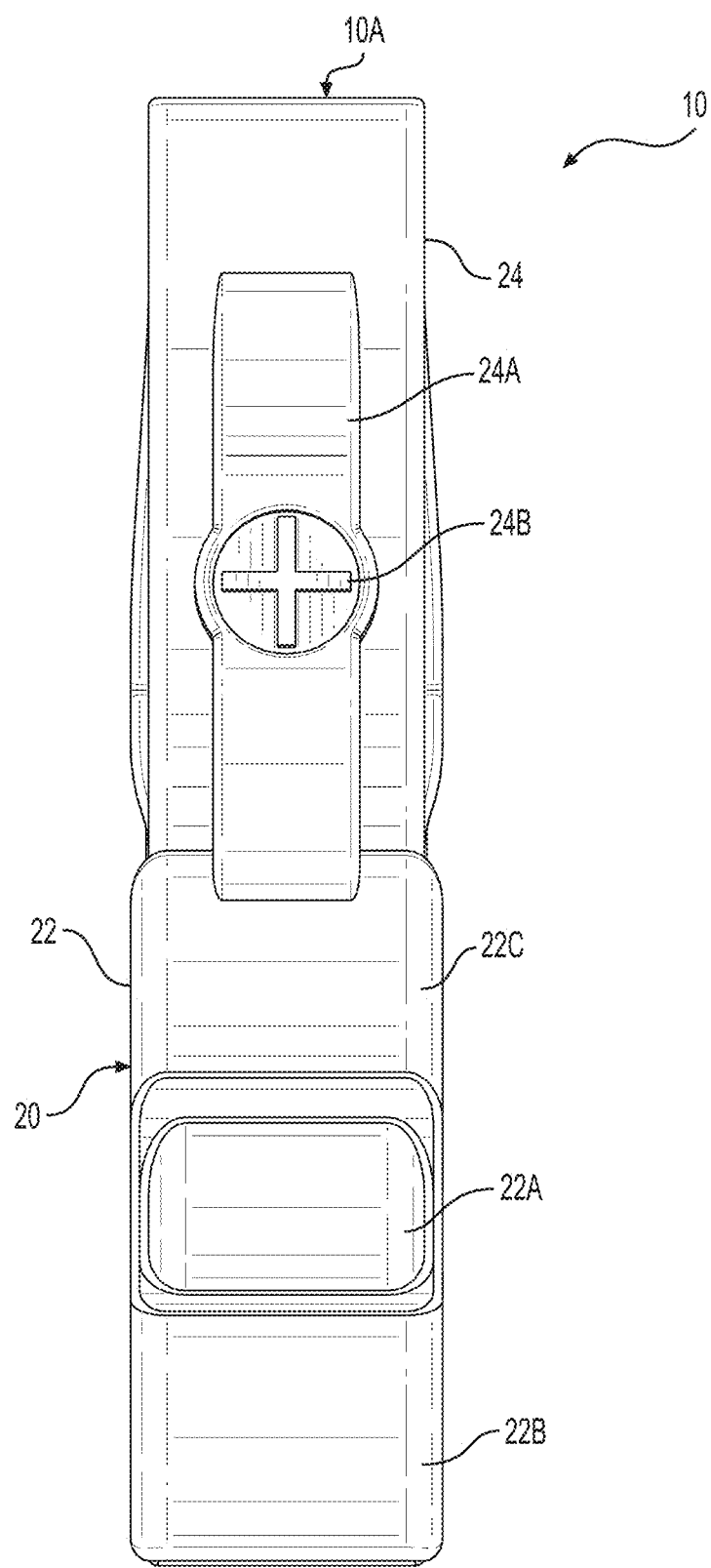
FIG. 3 is a right side view of the battery clamp shown in FIG. 1.
Figure 4:
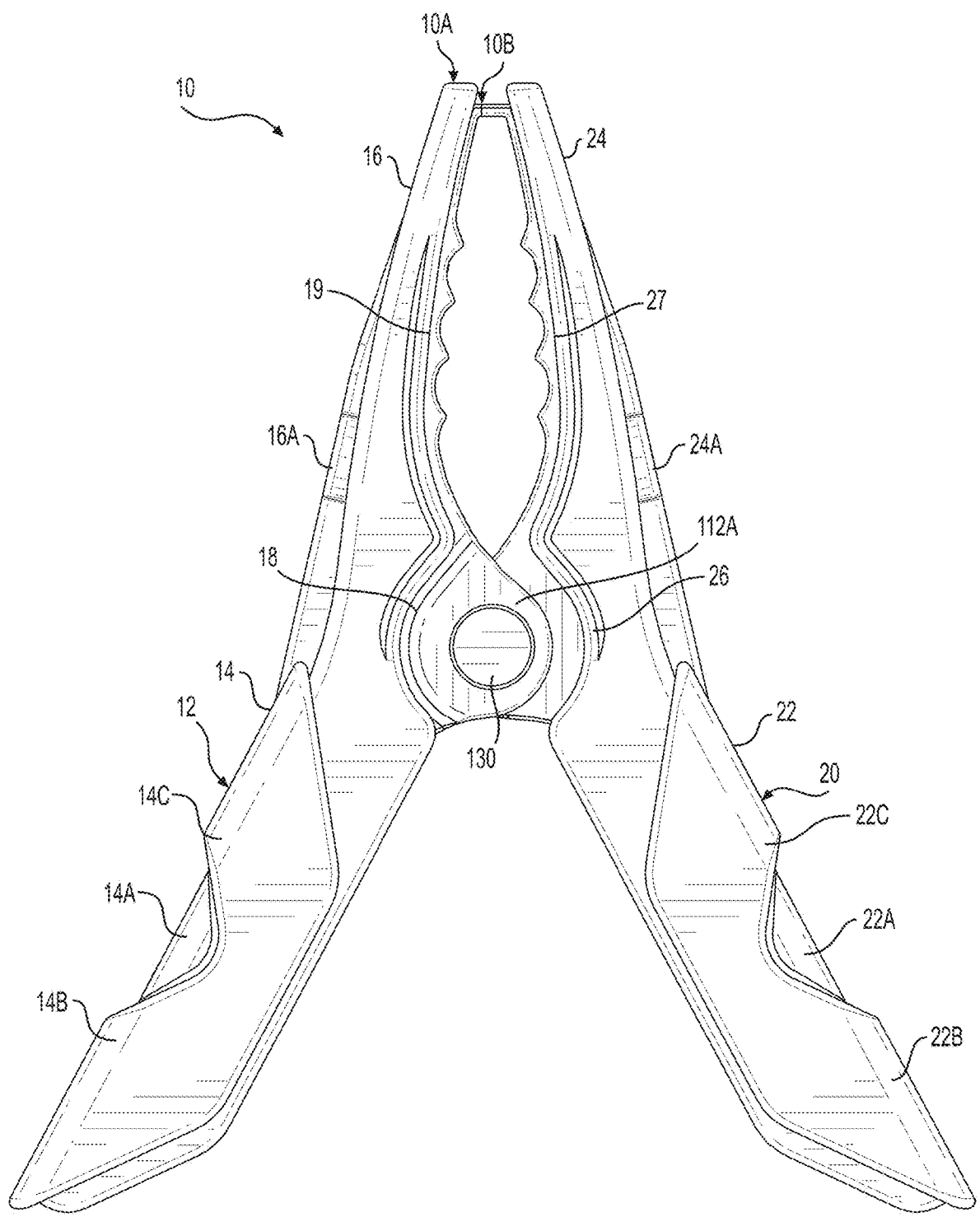
FIG. 4 is a front view of the battery clamp shown in FIG. 1.
Figure 5:
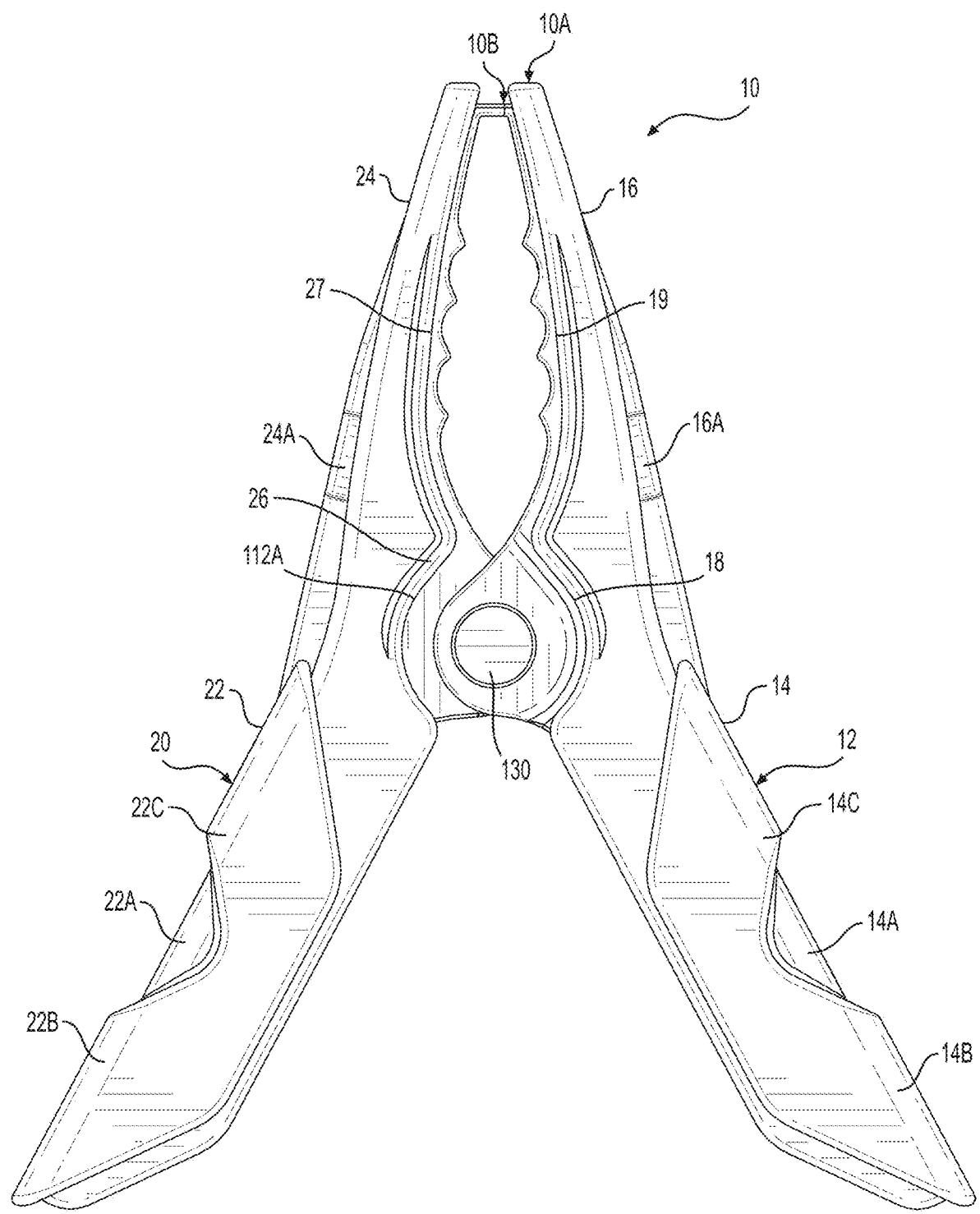
FIG. 5 is a rear view of the battery clamp shown in FIG. 1.
Figure 6:
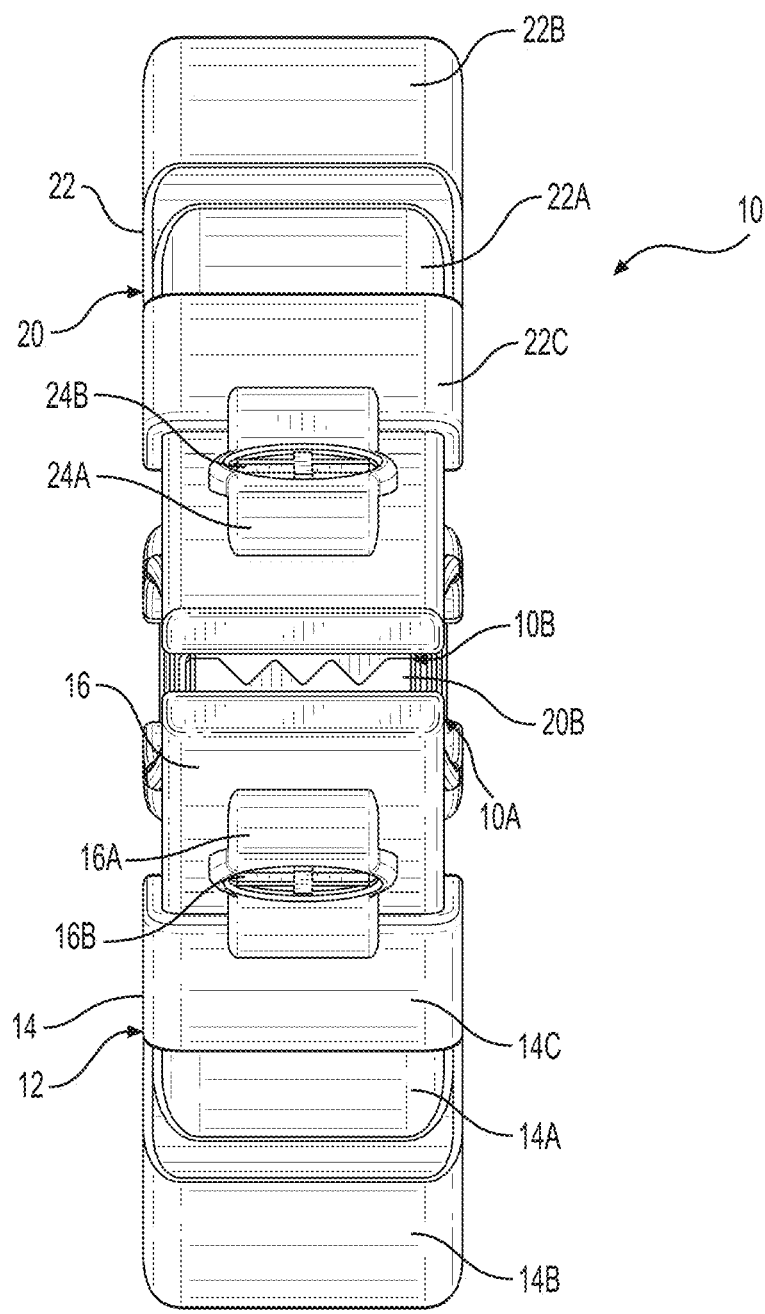
FIG. 6 is a top view of the battery clamp shown in FIG. 1.
Figure 7:
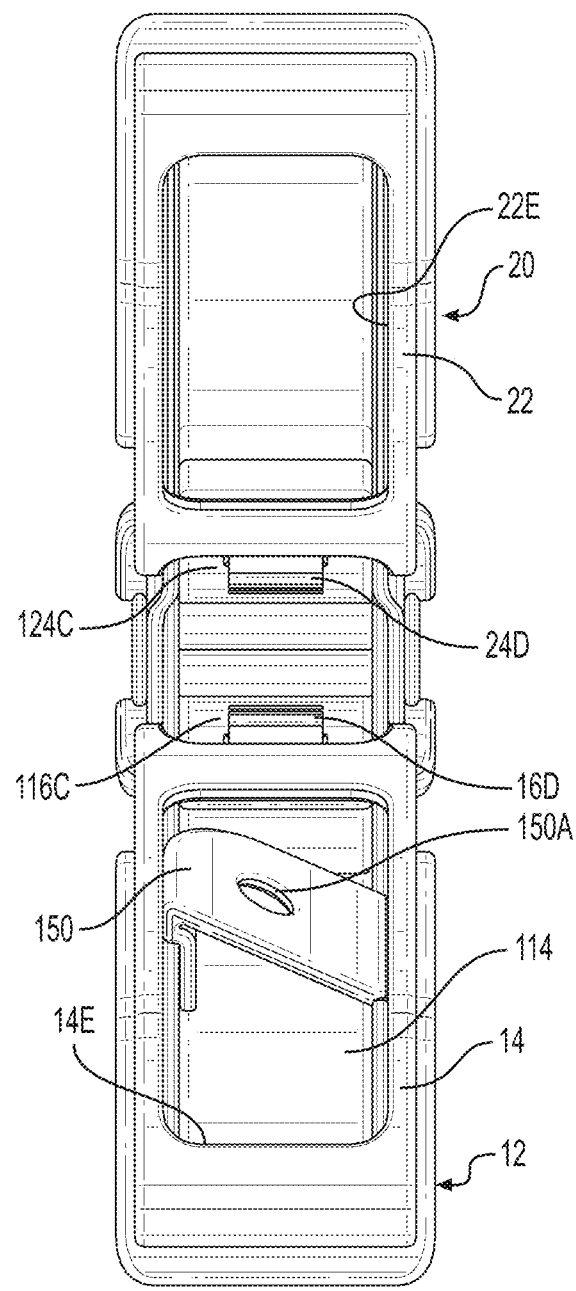
FIG. 7 is a bottom view of the battery clamp shown in FIG. 1.
Figure 8:
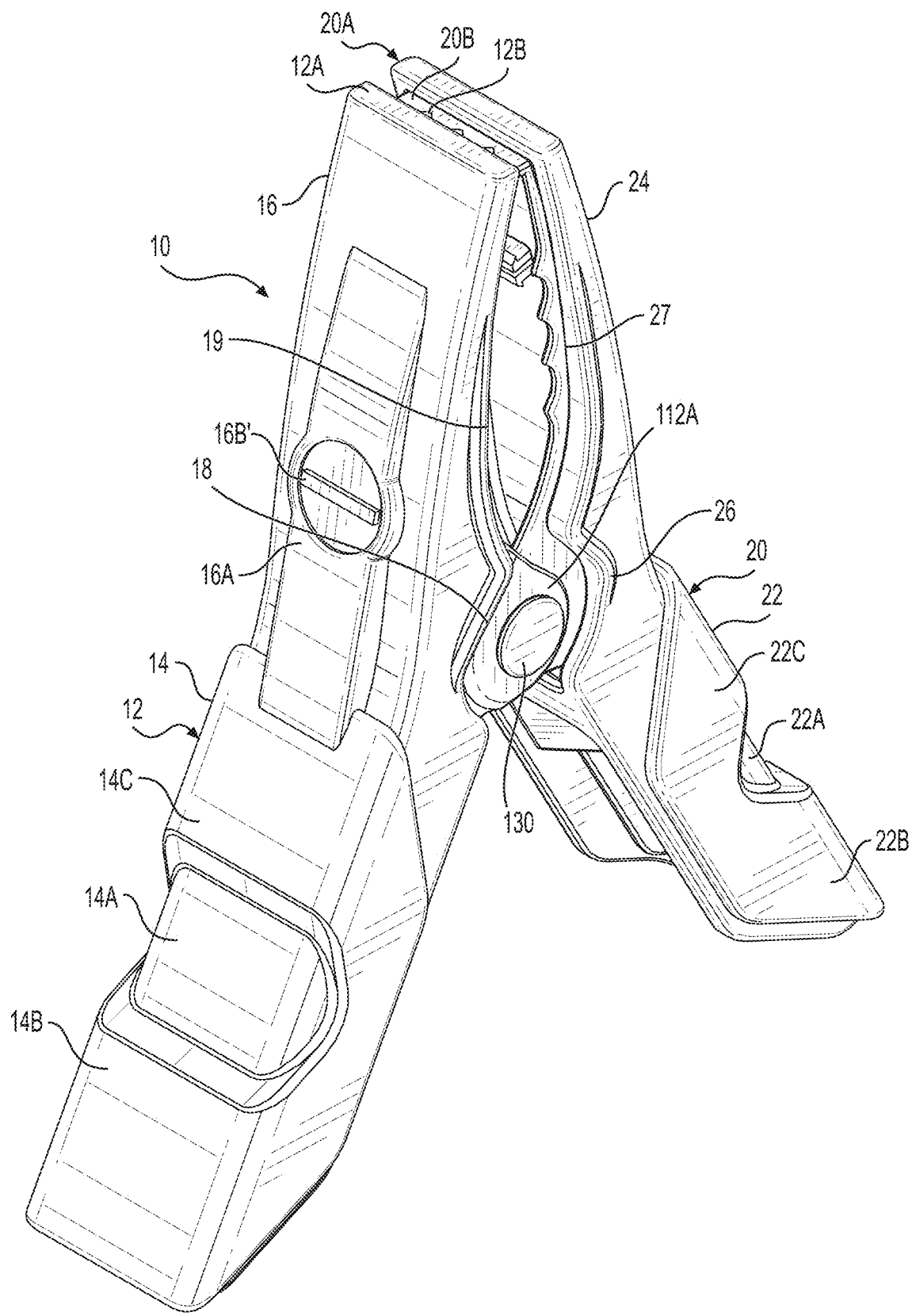
FIG. 8 is a perspective view of a negative polarity battery clamp according to the present invention, the same as the positive polarity battery clamp shown in FIG. 1 except for a negative polarity symbol instead of a positive polarity symbol.

The outer battery clamp portion 10A comprises a first outer battery clamp member 12 (e.g. made of plastic injection molded material) having an outer handle portion 14 and outer clamp portion 16 and a second outer battery clamp member 20 (e.g. made of plastic injection molded material) having an outer handle portion 22 and an outer clamp portion 24, as shown in FIG. 1.

The outer handle portion 14 is provided with an outer handle surface 14A and protrusions 14B, 14C. The outer handle portion 22 is provided with an outer handle surface 22A and protrusions 22B, 22C. It is noted that the protrusions 14B, 14C, 22B, 22C form an X-shaped protrusion together when the outer handle portions 14, 22 are squeezed together by a user.

The outer clamp portion 16 is provided with a protrusion 16A and a raised positive (+) polarity symbol 16B. The outer clamp portion 24 is provided with a protrusion 24A (FIG. 3) and a raised positive (+) polarity symbol 24B.

The first battery clamp member 12 is provided with arc-shaped inner edges 18 located on both sides of the first battery clamp member 12. The second battery clamp member 22 is provided with arc-shaped inner edges 26 located on both sides of the second battery clamp member 22. See FIGS. 4 and 5.

Figure 9:
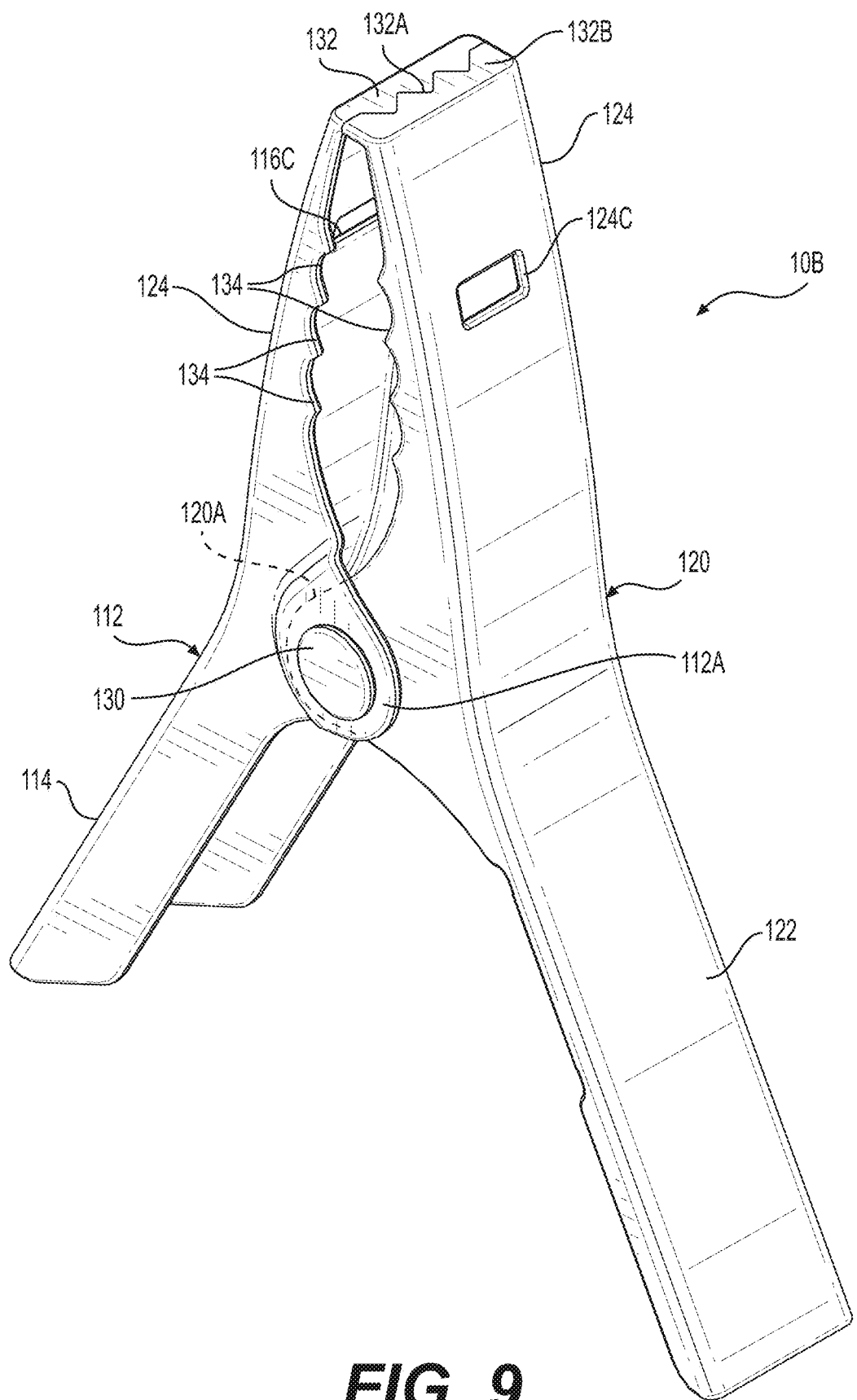
FIG. 9 is a perspective view of an inner battery clamp part of the battery clamps shown in FIGS. 1 and 8.
Figure 10:
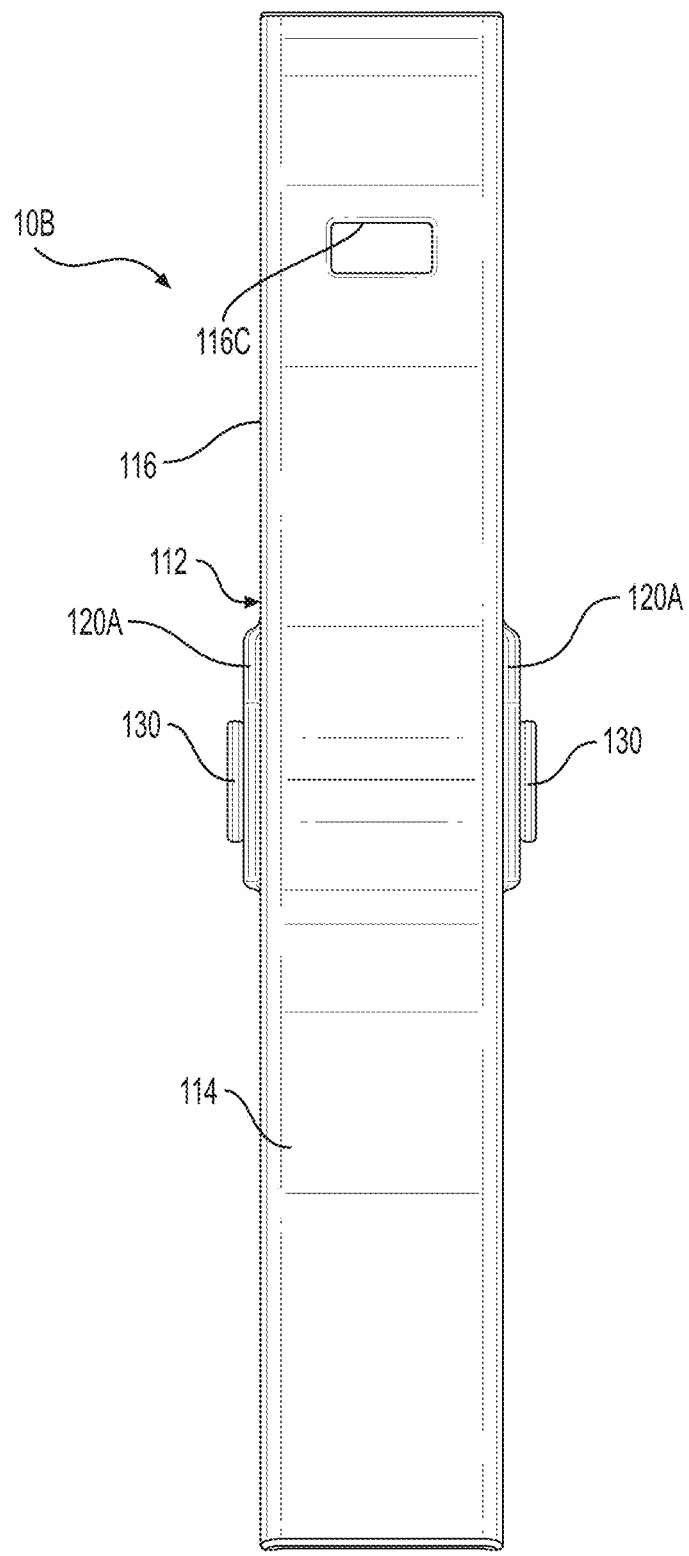
FIG. 10 is a left side view of the battery clamp part shown in FIG. 9.
Figure 11:
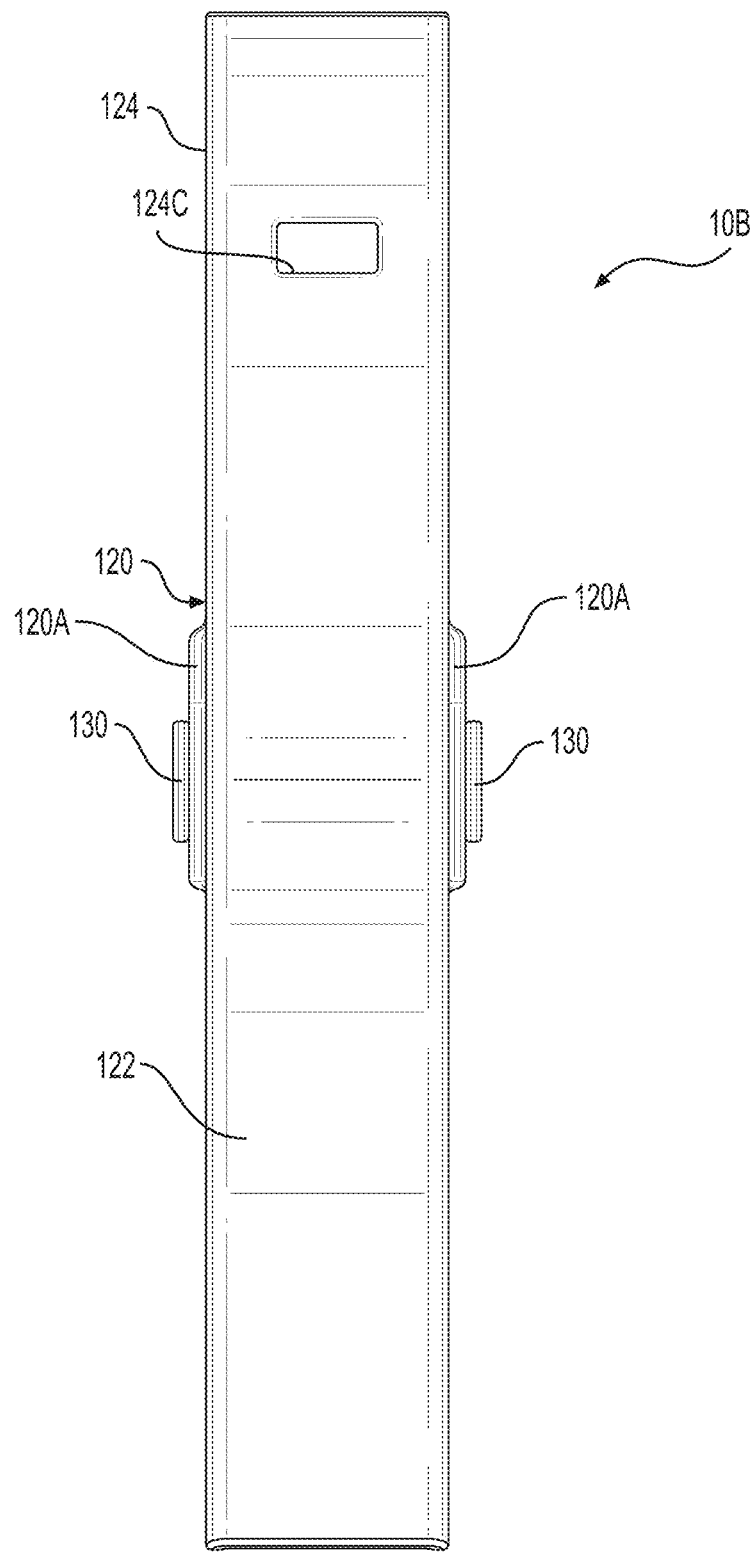
FIG. 11 is a right side view of the battery clamp part shown in FIG. 9.
Figure 12:
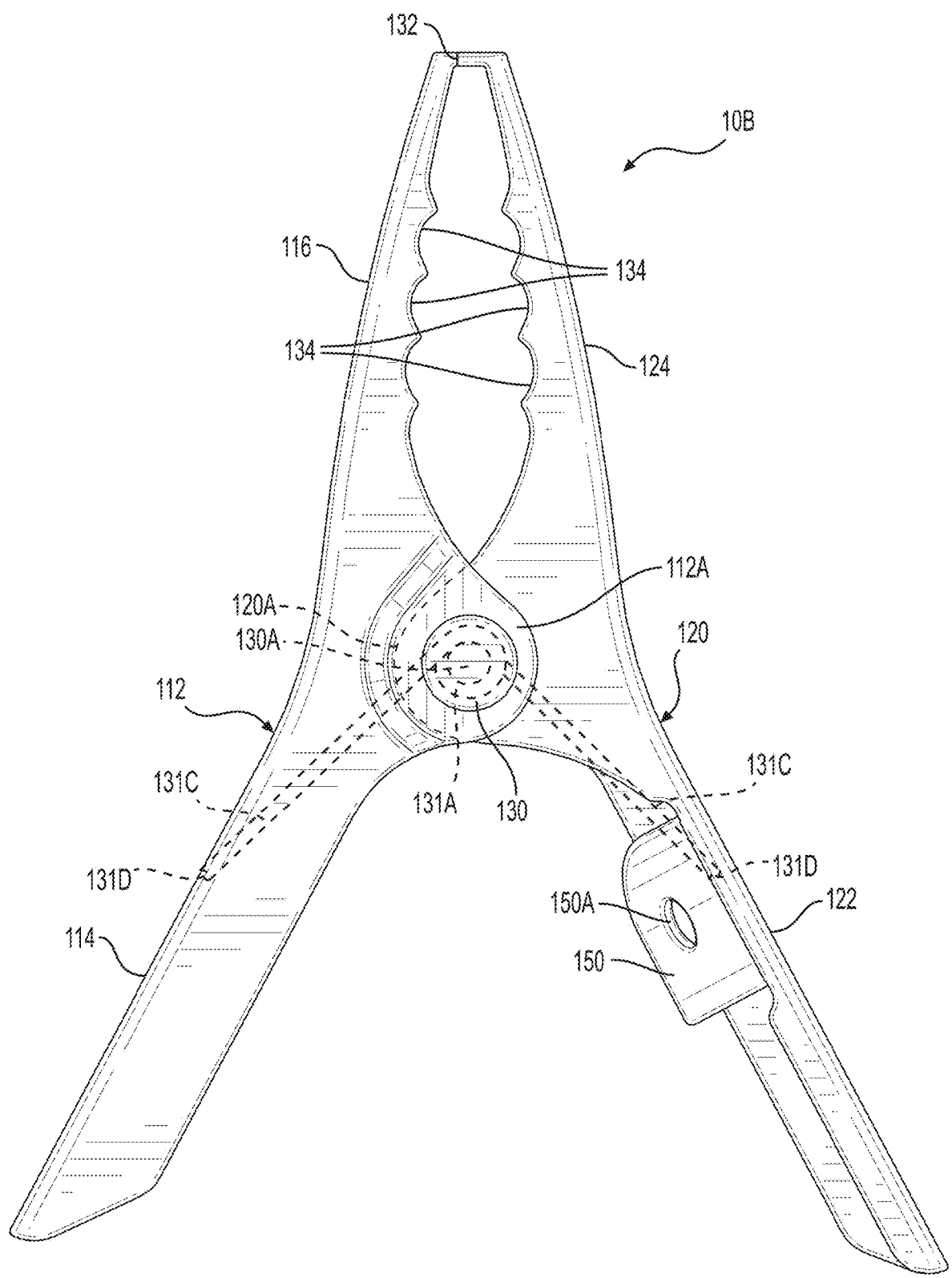
FIG. 12 is a front view of the battery clamp part shown in FIG. 9.
Figure 13:
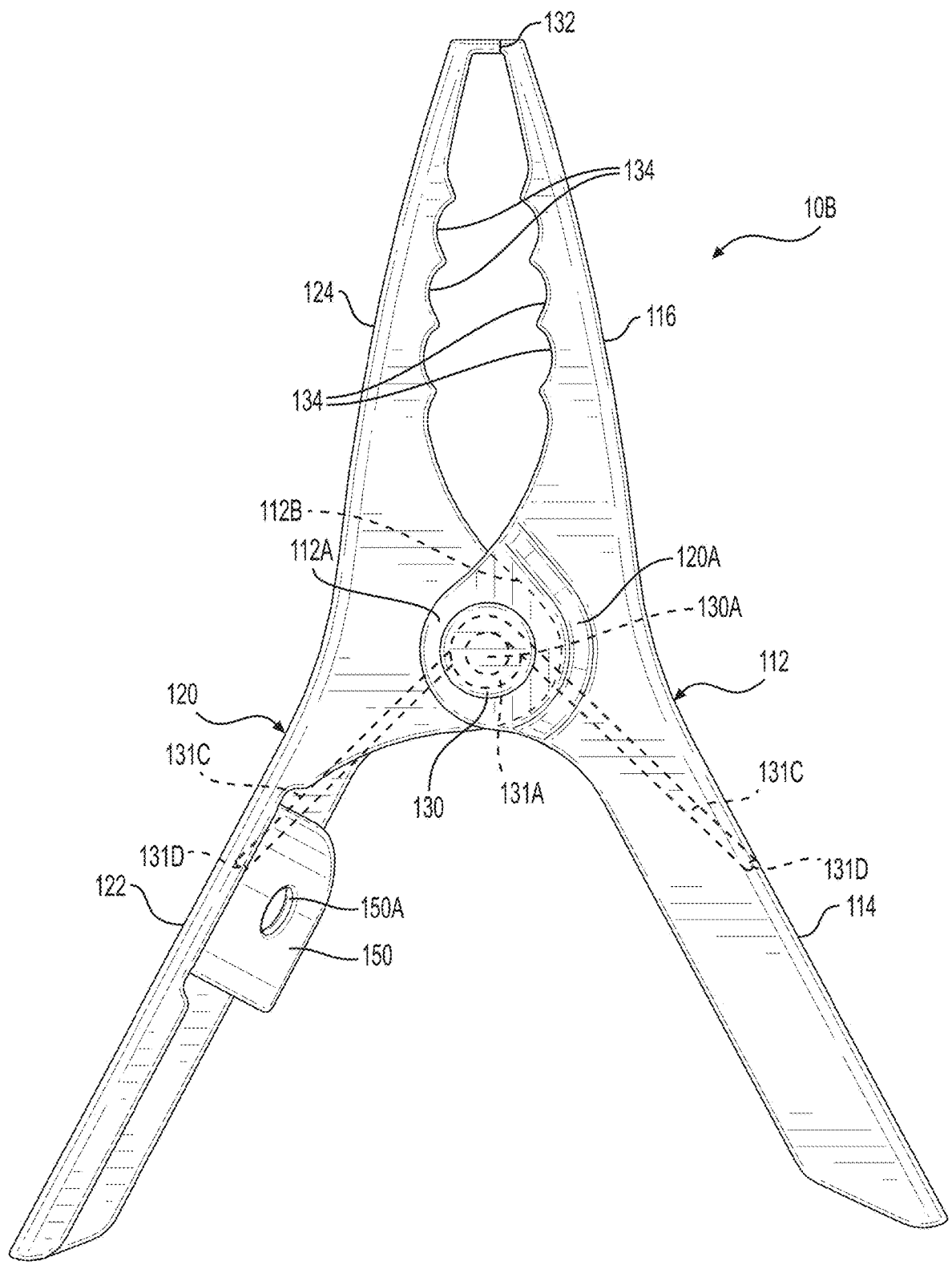
FIG. 13 is a rear view of the battery clamp part shown in FIG. 9.
Figure 14:
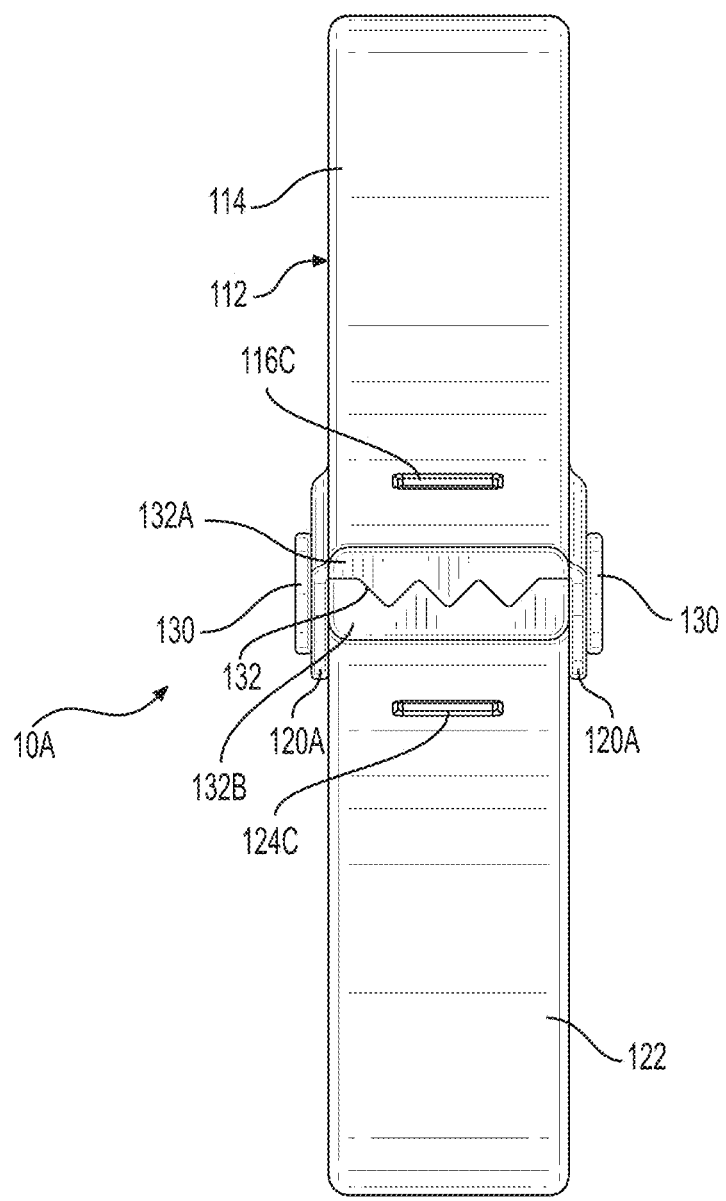
FIG. 14 is a top view of the battery clamp part shown in FIG. 9.

The inner battery clamp device 10B comprises a first inner battery clamp portion 112 made of conductive metal (e.g. made from stamped or forged metal plate) having an inner handle portion 114 and an inner clamp portion 116. The first inner battery clamp member 112 is pivotally connected together (e.g. via pivot pin 130) to a second inner battery clamp portion 120 having an inner handle portion 122 and an inner clamp portion 124, as shown in FIG. 9.

The first inner battery clamp member 112 is provided with a slot 116C (FIG. 9) for providing a mechanical connection (e.g. snap fit connection) with a protrusion (e.g. snap fit protrusion 16D the same as snap fit protrusion 24D shown in FIG. 1) of the first outer battery clamp member 12. The second inner battery clamp member 120 is provided with a slot 124C (FIG. 9) for providing a mechanical connection (e.g. snap fit connection) with a protrusion (e.g. snap fit protrusion 24D shown in FIG. 1) of the second outer battery clamp member 20.

The snap fit connections described above are located at the outer clamp portions 16, 24. Additional connections (e.g. mechanical connections, additional snap fit connections) can be provided on the outer handle portions 14, 22. For example, the outer handle portions 14, 22 can be provided with transverse cross members 14F, 14G, 22F, 22G (FIG. 7) configured for connecting to (e.g. capturing) the inner handle portions 114, 122. Specifically, the transverse cross members 14F, 22F wrap across and capture inner sides (e.g. inner edges) of the inner handle portions 114, 122. The transverse cross members 14G, 22G, wrap across and capture the edges and ends of the inner handle portions 114, 122. During assembly, each inner handle portion 114, 122 is slipped underneath of the transverse cross members 14F, 14G, 22F, 22G until the inner handle portions 114, 122 bottom out within the cross member 22F, 22G, and then the outer clamp portions 16, 24 are snap fitted to the inner clamp portions 116, 124.

Again, the inner battery clamp 10B is made of an electrically conductive material such as metal. For example, the first inner battery clamp portion 112 and the second inner battery clamp portion 120 are made from stamped sheet metal (e.g. steel, aluminum, copper, brass, metal alloy, or other suitable electrically conductive material), and then metal plated (e.g. with chrome, nickel, metal alloy) to make corrosion resistant. The first inner battery clamp portion 112 and the second inner battery clamp portion 120 are then assembled together with spring 131 (FIG. 17) and pivot pin 130 (FIG. 9).

Figure 15:
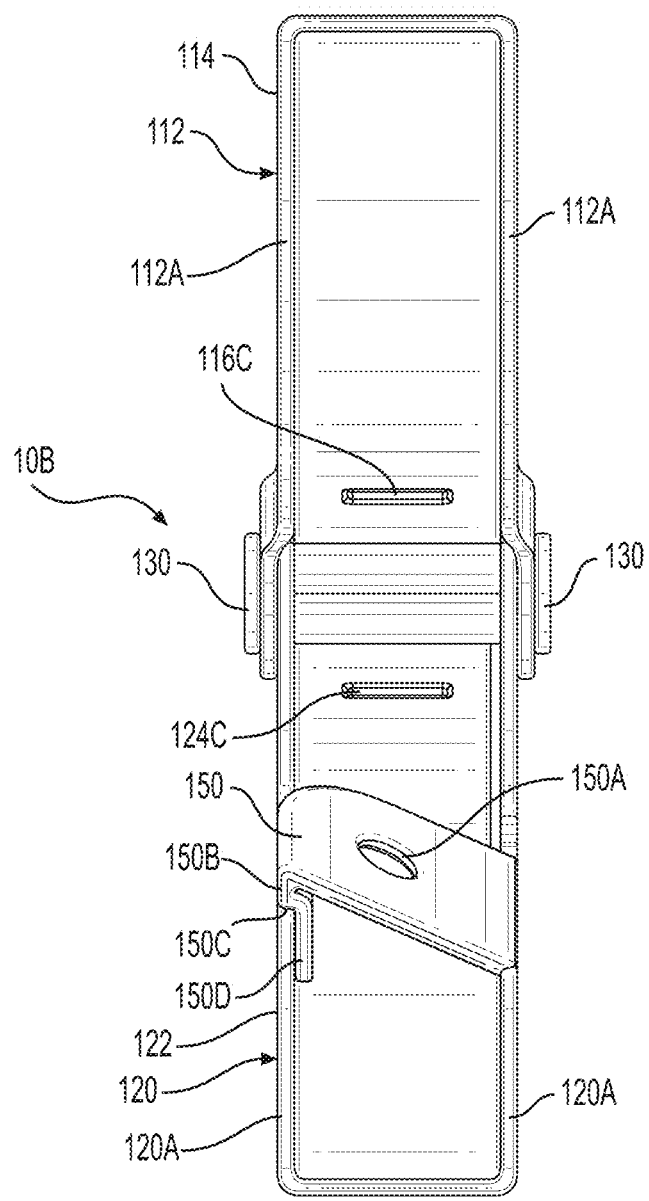
FIG. 15 is a bottom view of the battery clamp part shown in FIG. 9.
Figure 16:
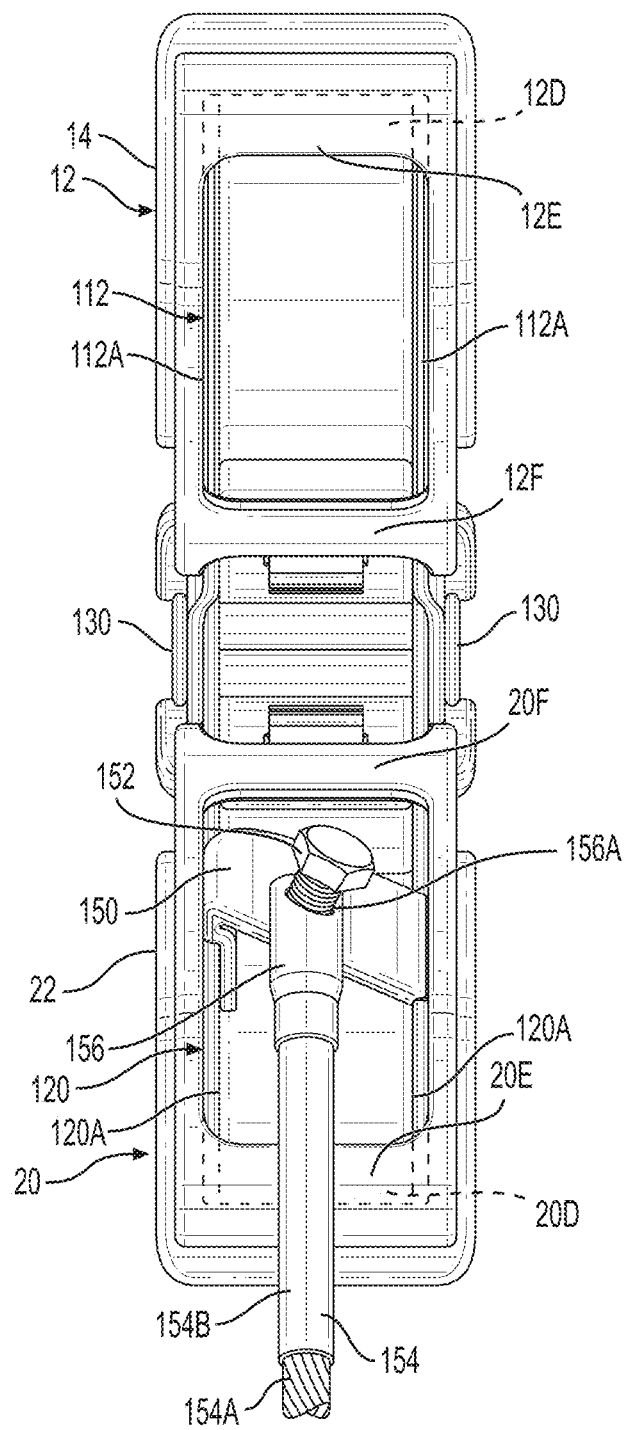
FIG. 16 is a bottom view of the battery clamp shown in FIG. 1 showing a battery cable being connected to the battery clamp.
Figure 17:
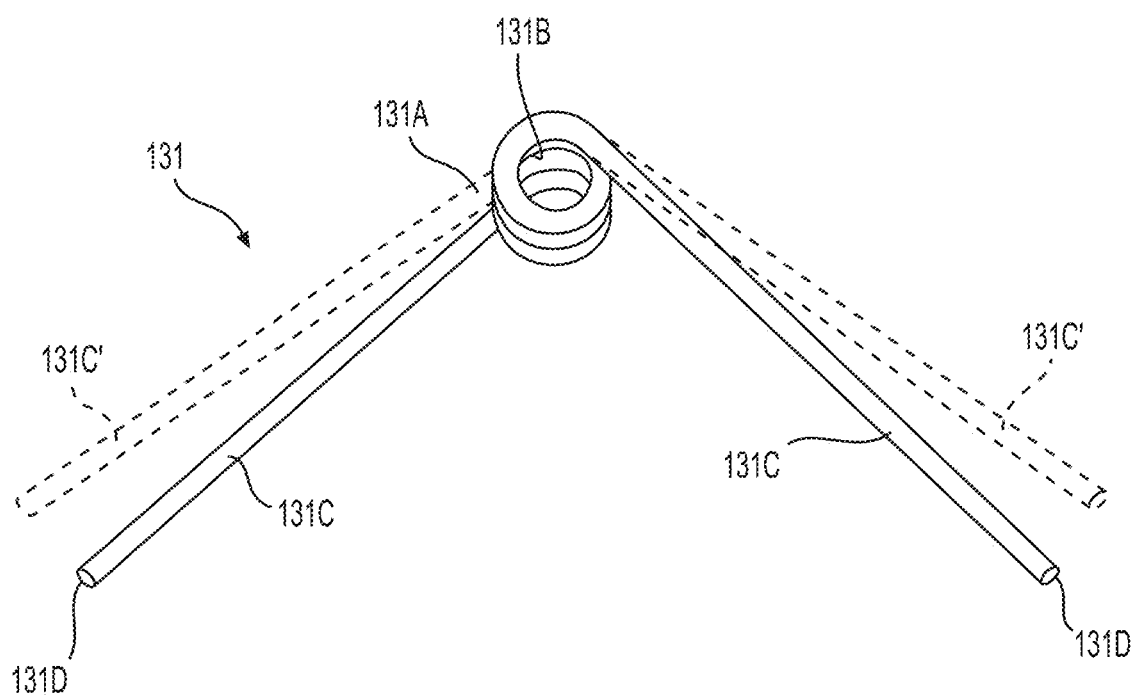
FIG. 17 is a perspective view of a spring part of the battery clamp shown in FIG. 1 and the battery clamp part shown in FIG. 9.

The inner battery clamp 10B is configured for connection with a battery cable 154 (FIG. 16). For example, the inner handle portion 122 is fitted with an inclined connector 150, as shown in FIG. 15. The inclined connector 150, for example, is a metal plate oriented transversely relative to the inner handle portion 122. The left side (FIG. 15) of the metal plate is raised or elevated relative to the inner edge 120A of the second inner battery clamp portion 120 while the right side of the metal plate is lowered or even relative to the inner edge 120 of the second inner battery clamp portion 120.

The inclined connector 150 is provided with a threaded hole 150A for accommodating a threaded fastener (e.g. bolt 152 (FIG. 16, screw, Allen head bolt, set screw).

The inclined connector 150 can be a separate metal plate connected (e.g. welded, spot welded, butt welded, brazed, soldered, and/or mechanically fastened) to the inner edges 120A of the second inner battery clamp portion 120.

The left side of the inclined connector 150 is provided with a bent end portion having flat sections 150B, 150C with step 150D located therebetween. The step 150D allows the left side of the inclined connector 150 to be lowered until contact with the inner edge 120A to position the installed located during assembly. Then, the flat section 150C is connected to an inner surface of the second inner battery clamp portion 120 adjacent to the inner edge 120A, for example, by spot welding.

The battery cable 154 is provided with a connector end 156 having a through hole 156A for accommodating the bolt 152. The battery cable 154 comprises an electrical conductor (e.g. cable, braided cable, wire, twisted wires) having an insulating sleeve 154. The battery cable 154 is connected to the battery clamp device 10 by inserting the bolt 152 into the through hole 156a, and then threading the bolt 152 into the threaded through hole 150A of the inclined plate 150 until fully tightened, for example, using a socket wrench or wrench.

The inclined plate sets the through hole 150A and bolt 152 at an angle to allow improved access to the bolt 152 for tighten same, and using a tool to fully tighten the bolt 152 into the through hole 150A of the inclined plate 150. Specifically, the angle prevents mechanical interference with a user's finger attempting to tighten or loosen the bolt 152, or with a tool attempting to tighten or loosen the bolt 152.

A spring 131 is installed within the inner battery clamp 10B to spring bias the outer clamp portions 12, 16 together. Specifically, the spring 131 is provided with a through hole 131B to accommodate the pivot pin 130 while the arm 131C having ends 131D contact an inner surface of the arm portions 114, 122 (FIG. 9) of the inner battery clamp 10B.

The invention claimed is:

1. A battery clamp device, comprising:
a first inner metal battery clamp member having a handle portion and a clamp portion;
a second inner metal battery clamp member having a handle portion and a clamp portion;
a first outer insulating battery clamp member having a handle portion and a clamp portion connected to the first inner metal battery clamp;
a second outer insulating battery clamp member having a handle portion and a clamp portion connected to the second inner metal battery clamp;
a pivot pin pivotally connecting the first inner metal battery clamp member to the second inner metal battery clamp member; and
a battery cable connector connected to an inner side at least one of the first inner metal battery clamp member and the second inner metal battery clamp member, the battery cable connector being a metal plate having a threaded hole,
wherein the metal plate is oriented to allow a user's fingers or a tool to align with a threaded fastener for tightening or loosening the threaded fastener without mechanical interference from handle portions of the battery clamp device,
wherein the first inner metal battery clamp member having the handle portion and the clamp portion nests within at least a portion of the first outer insulating battery clamp member having the handle portion and the clamp portion connected to the first inner metal battery clamp,
wherein a second inner metal battery clamp member having a handle portion and a clamp portion nests within at least a portion of the second outer insulating battery clamp member having the handle portion and the clamp portion connected to the second inner metal battery clamp,
wherein the first outer insulating battery clamp member snap fits onto the first inner metal battery clamp member,
wherein the second outer insulating battery clamp member snap fits onto the second inner metal battery clamp member,
wherein the first outer insulation battery clamp member comprises a snap fit protrusion snap fitting into a slot provided in the first inner metal battery clamp member, and
wherein the second outer insulation battery clamp member comprises a snap fit protrusion snap fitting into a slot provided in the second inner metal battery clamp member.

2. A battery clamp device, comprising:
a first inner metal battery clamp member having a handle portion and a clamp portion;
a second inner metal battery clamp member having a handle portion and a clamp portion;
a first outer plastic battery clamp member connected to the first inner metal battery clamp;
a second outer plastic battery clamp member connected to the second inner metal battery clamp;
a pivot pin pivotally connecting the first inner metal battery clamp member to the second inner metal battery clamp member; and
a battery cable connector connected to an inner side at least one of the first inner metal battery clamp member and the second inner metal battery clamp member, the battery cable connector being an inclined metal plate,
wherein the inclined metal plate is oriented to allow a tool to align with a threaded fastener for tightening or loosening the threaded fastener without mechanical interference from handle portions of the battery clamp device,
wherein the first inner metal battery clamp member having the handle portion and the clamp portion nests within at least a portion of the first outer insulating battery clamp member having the handle portion and the clamp portion connected to the first inner metal battery clamp, wherein a second inner metal battery clamp member having a handle portion and a clamp portion nests within at least a portion of the second outer insulating battery clamp member having the handle portion and the clamp portion connected to the second inner metal battery clamp, wherein the first outer insulating battery clamp member snap fits onto the first inner metal battery clamp member, wherein the second outer insulating battery clamp member snap fits onto the second inner metal battery clamp member, wherein the first outer insulation battery clamp member comprises a snap fit protrusion snap fitting into a slot provided in the first inner metal battery clamp member, and wherein the second outer insulation battery clamp member comprises a snap fit protrusion snap fitting into a slot provided in the second inner metal battery clamp member.

3. A battery clamp device, comprising:
a first inner metal battery clamp member having a handle portion and a clamp portion;
a second inner metal battery clamp member having a handle portion and a clamp portion;
a first outer plastic battery clamp member connected to the first inner metal battery clamp;
a second outer plastic battery clamp member connected to the second inner metal battery clamp;
a pivot pin pivotally connecting the first inner metal battery clamp member to the second inner metal battery clamp member; and
a battery cable connector connected between a pair of inner edges of the at least one of the first inner metal battery clamp member and the second inner metal battery clamp member, the battery cable connector being an inclined metal plate having a threaded hole,
wherein the inclined metal plate is oriented transverse relative to the at least one of the first inner metal battery clamp member and the second inner metal battery clamp member to allow a tool to align with a threaded fastener for tightening or loosening the threaded fastener without mechanical interference from handle portions of the battery clamp device,
wherein the first inner metal battery clamp member having the handle portion and the clamp portion nests within at least a portion of the first outer insulating battery clamp member having the handle portion and the clamp portion connected to the first inner metal battery clamp,
wherein a second inner metal battery clamp member having a handle portion and a clamp portion nests within at least a portion of the second outer insulating battery clamp member having the handle portion and the clamp portion connected to the second inner metal battery clamp,
wherein the first outer insulating battery clamp member snap fits onto the first inner metal battery clamp member,
wherein the second outer insulating battery clamp member snap fits onto the second inner metal battery clamp member, wherein the first outer insulation battery clamp member comprises a snap fit protrusion snap fitting into a slot provided in the first inner metal battery clamp member, and wherein the second outer insulation battery clamp member comprises a snap fit protrusion snap fitting into a slot provided in the second inner metal battery clamp member.

4. The device according to claim 1, wherein the metal plate is an inclined metal plate.

5. The device according to claim 4, wherein the inclined metal plate is oriented transversely relative to the at least one of the first inner metal battery clamp member and the second inner metal battery clamp member.

6. The device according to claim 5, wherein at least one of the first inner metal battery clamp member and the second inner metal battery clamp member have a U-shaped transverse cross section along a length of at least one of the first inner metal battery clamp member and the second inner metal battery clamp member providing a pair of spaced apart inner edges, the inclined metal plate extending between the pair of spaced apart inner edges.

7. The device according to claim 6, wherein a low end of the inclined metal plate abuts one edge of the pair of spaced apart inner edges and a high end of the inclined metal plate bends towards an opposite edge of the pair of spaced apart inner edges and connects to the opposite edge of the pair of spaced apart inner edges.

8. The device according to claim 7, wherein a portion of the inclined metal plate that bends towards the opposite edge of the pair of spaced apart inner edges is bent to provide a step that abuts a top of the opposite edge of the pair of spaced apart inner edges.

9. The device according to claim 8, wherein an end portion of the inclined metal plate that bends towards the opposite edge of the pair of inner edges and located below the step abuts an inner side of the opposite edge.

10. The device according to claim 9, wherein the low end and the high end of the inclined metal plate are welded to a respective edge of the pair of spaced apart inner edges.

11. The device according to claim 1, wherein the first inner metal battery clamp member is provided with a pair of pivot plate portions and the second inner metal battery clamp member is provided with a pair of pivot plate portions, wherein the pair of pivot plate portions of the first inner metal battery clamp member overlap with the pair of pivot plate portions of the second inner metal battery clamp member.

12. The device according to claim 11, wherein the pair of pivot plate portions of the first inner metal battery clamp member configured to accommodate the pivot plate portions of the second inner metal battery clamp.

13. The device according to claim 1,
wherein the first outer insulation battery clamp member comprises a plurality of spaced apart snap fit protrusions snap fitting into a plurality of spaced apart slot, respectively, in the first inner metal battery clamp member, and
wherein the second outer insulation battery clamp member comprises a plurality of spaced apart snap fit protrusions snap fitting into a plurality of spaced apart slots provided in the second inner metal battery clamp member.

14. The device according to claim 1, wherein each snap fit protrusion is split into two protrusion portions each having an edge barb portion to grip inner edges of respective slots after being snap fitted to prevent disconnection of each snap fit protrusion from each respective slot.

15. The device according to claim 1,
wherein the handle portion of the first outer insulating battery clamp member is provided with a protrusion, and
wherein the handle portion of the second outer insulating battery clamp member is provided with a protrusion.

16. The device according to claim 15, wherein the protrusions from the first and second handle portions form an X-shaped protrusion when the first and second handle portions are squeezed together.

17. The device according to claim 1, wherein the pivot pin is located at a position between the handle portion and clamp portion of each of the first and second inner metal battery clamp members.

\* \* \* \* \*